Sept. 11, 1956  V. W. PARTON  2,762,508
LUMBER SORTER
Filed Aug. 9, 1955  5 Sheets-Sheet 1
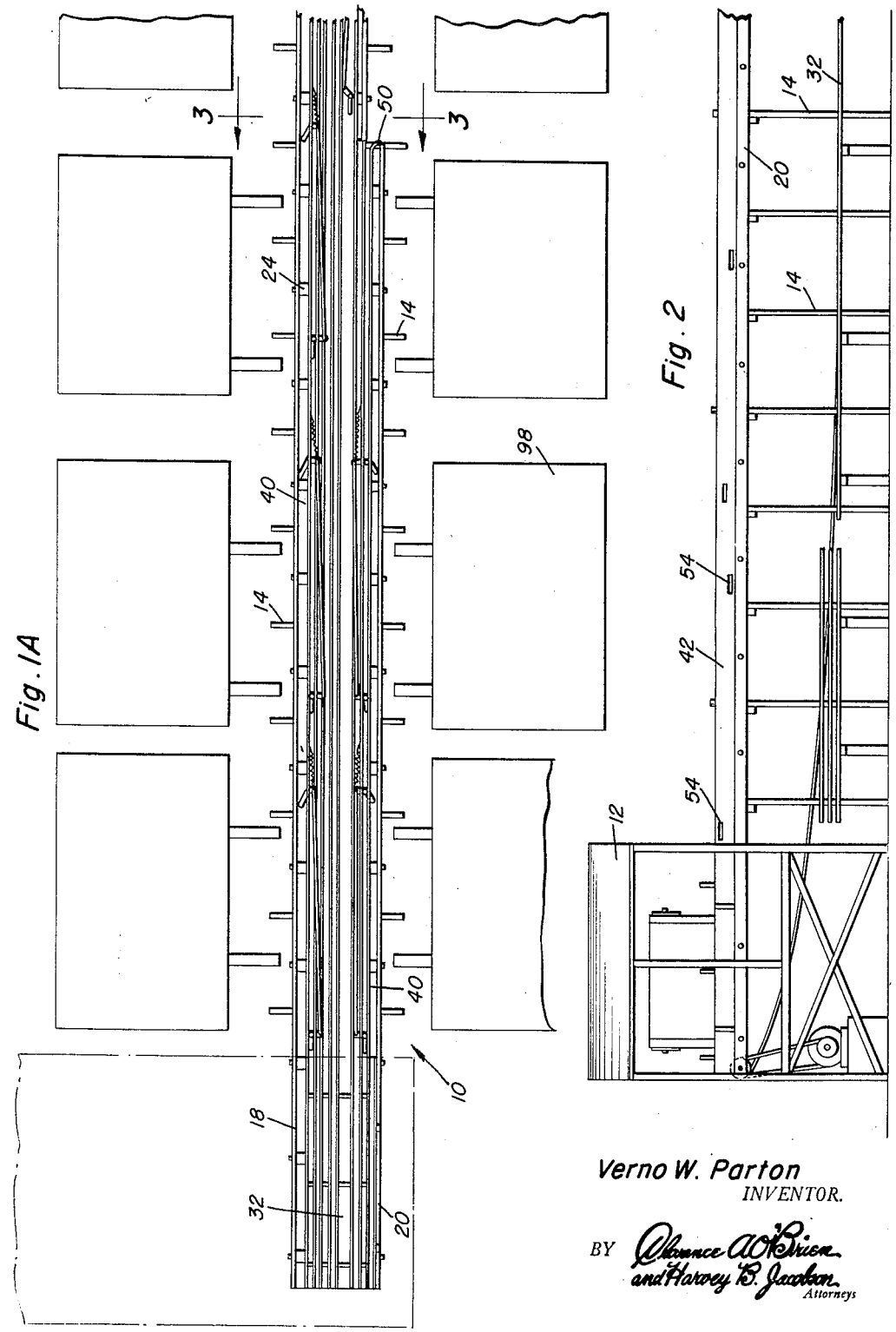
Verno W. Parton
INVENTOR.
BY Clarence A. O'Brien
and Harvey B. Jacobson
Attorneys Sept. 11, 1956   V. W. PARTON   2,762,508
LUMBER SORTER
Filed Aug. 9, 1955   5 Sheets-Sheet 2
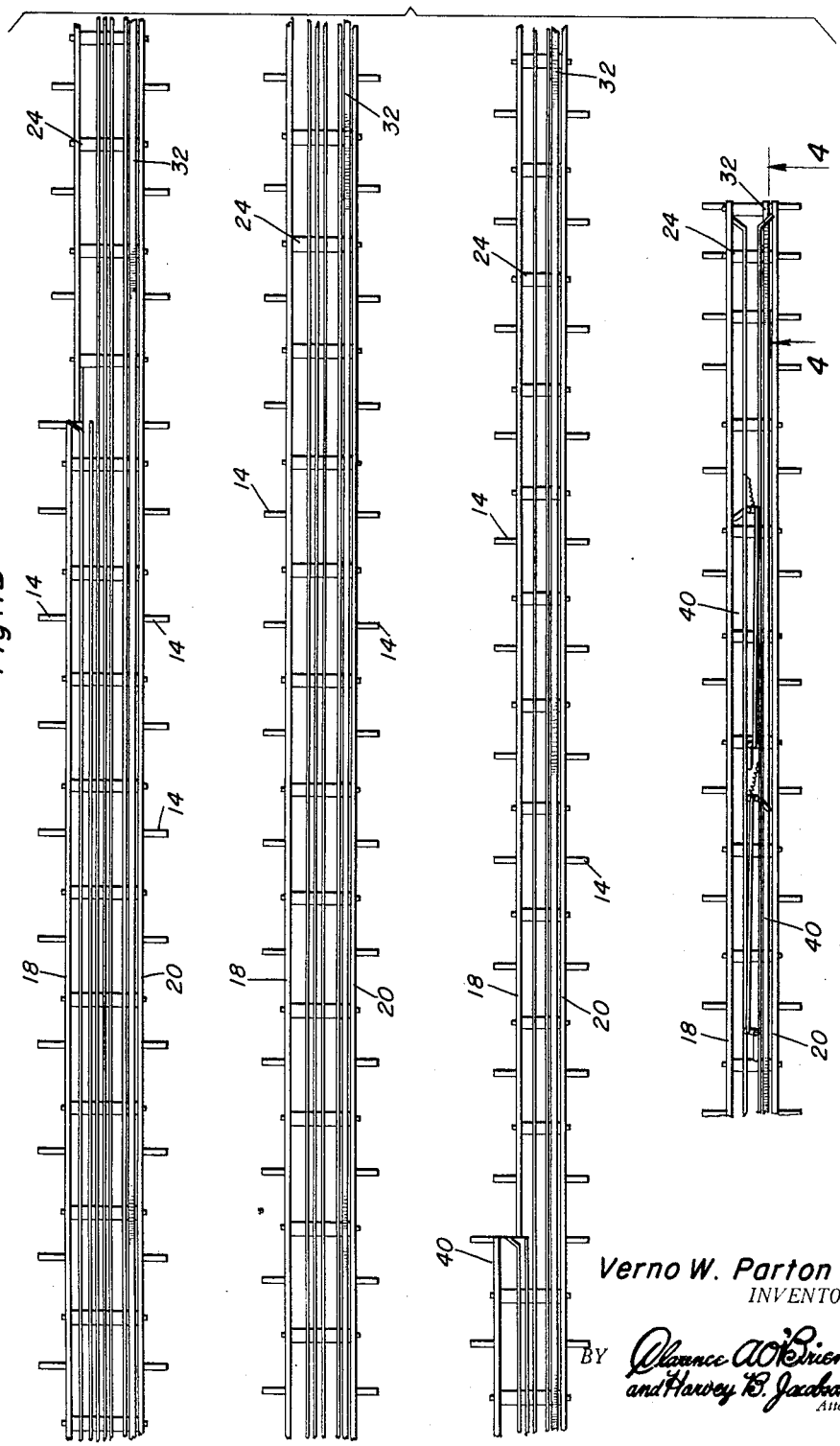
Verno W. Parton
INVENTOR.

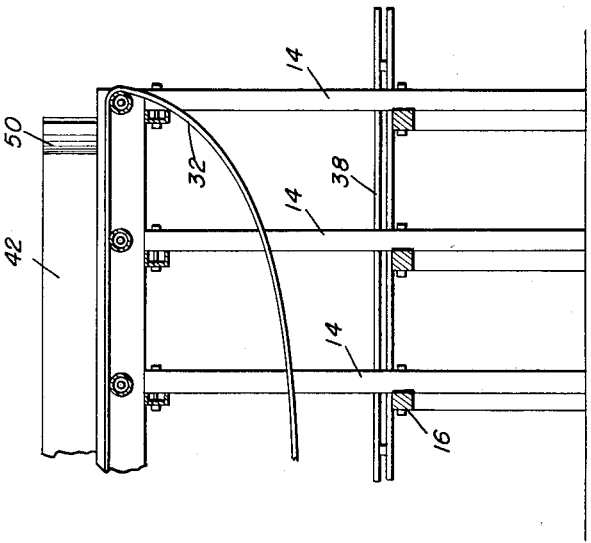
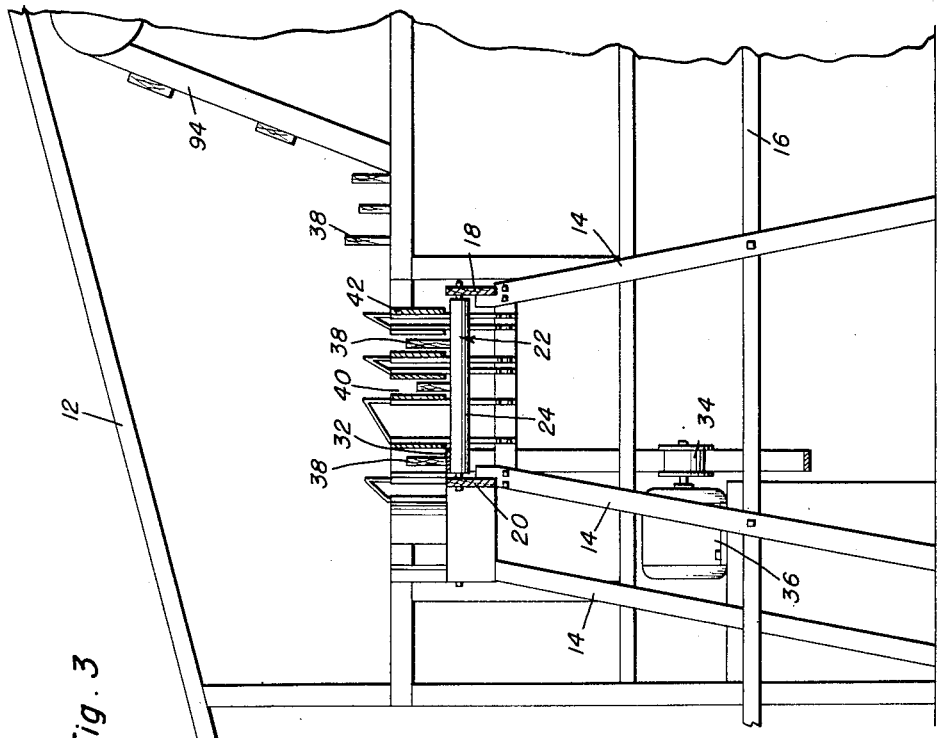

Sept. 11, 1956  V. W. PARTON  2,762,508
LUMBER SORTER
Filed Aug. 9, 1955  5 Sheets-Sheet 4
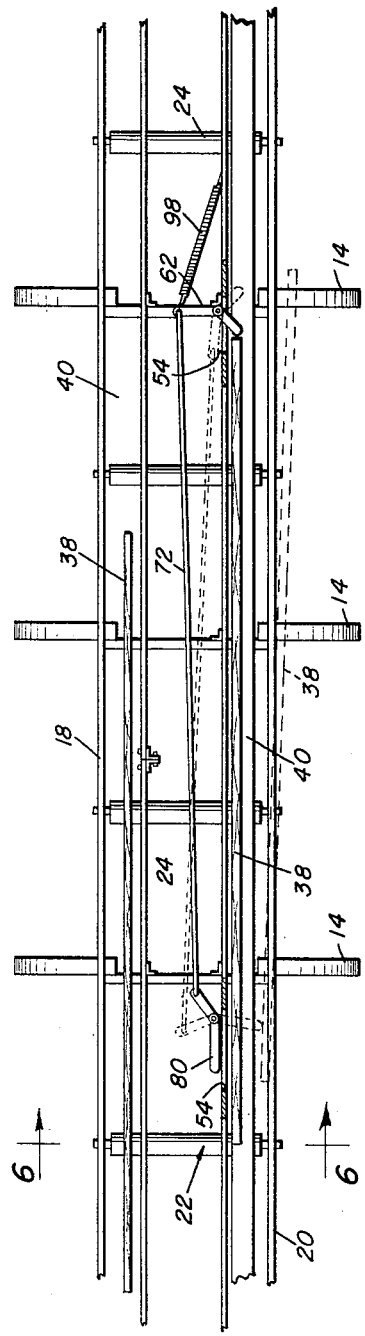
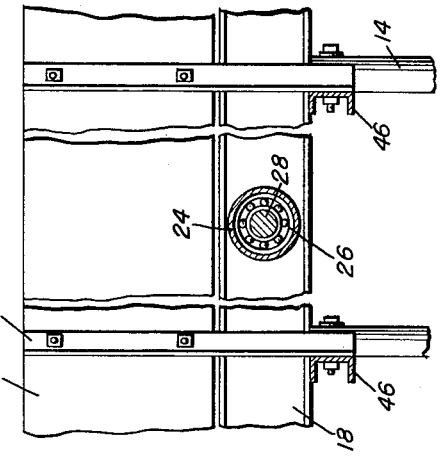
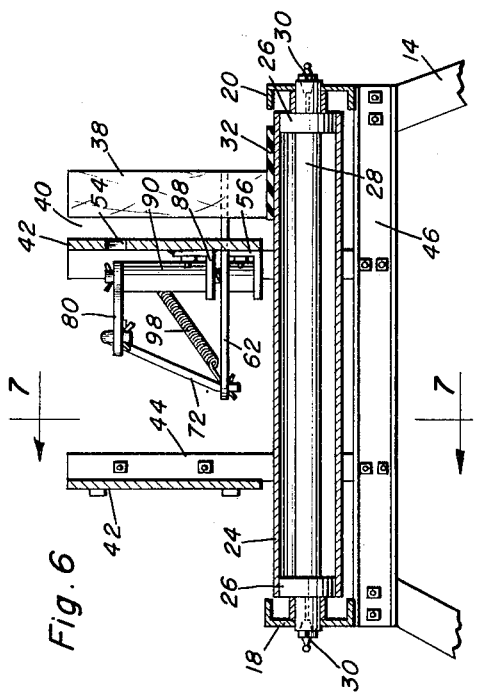
Verno W. Parton
INVENTOR.

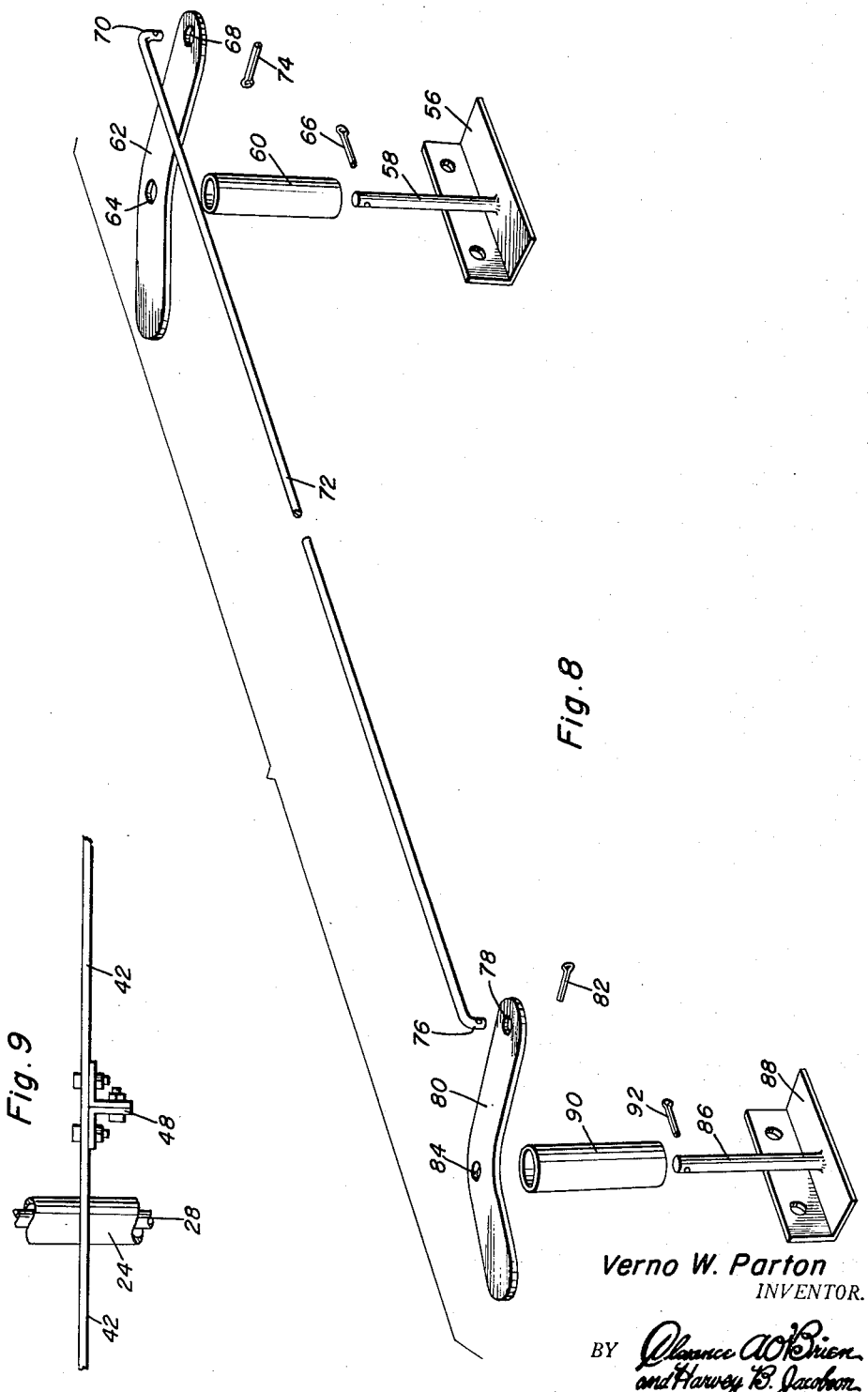

United States Patent Office 2,762,508
Patented Sept. 11, 1956

2,762,508

LUMBER SORTER

Verno W. Parton, Rutherfordton, N. C.

Application August 9, 1955, Serial No. 527,230

11 Claims. (Cl. 209—90)

This invention generally relates to a lumber sorter, and more specifically provides a device for separating lumber as to width and length into separate designated piles.

An object of the present invention is to provide a lumber sorter which will separate lumber into various length and width categories and place all of the lumber into separate piles according to such length and width.

In its construction, the device of the present invention includes a plurality of generally parallel conveying surfaces forming conveying paths for positioning individual pieces of lumber so that the lumber may pass along the conveying paths wherein each of the paths is provided with a mechanism actuated by the front end of the piece of lumber for projecting a kicker at the rear end of the lumber wherein the kicker will engage the piece of lumber and knock it off if it is as long as the distance between the kicker and its actuating means or as wide as the distance between the bottom of the conveying path and the kicker. The kickers and their actuating mechanisms are placed along the conveying paths for kicking off the longer and wider pieces of lumber initially and progressively kicking off the shorter and narrower pieces of lumber.

A further object of the present invention is to provide a lumber sorter in which all pieces of lumber are positioned in the device on the longitudinal edge thereof wherein the device is adapted for simultaneously sorting the lumber as to width and length and the device is flexible so that more or less increments of size may be separated into individual piles.

Other objects of the present invention will reside in its simplicity of construction, flexibility of operation, efficiency, adaptation for its particular use and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1–A and 1–B illustrate a top plan view of the lumber sorter of the present invention wherein the sorter begins with a plurality of conveying paths and gradually diminishes to a single path as designated specifically in Figure 1–B;

Figure 2 is a side elevational view of the construction of Figure 1–A;

Figure 3 is a sectional view taken upon line 3—3 of Figure 1–A;

Figure 4 is a detailed sectional view taken substantially upon a plane passing along section line 4—4 of Figure 1–B illustrating the details of the conveying mechanism;

Figure 5 is an enlarged plan view of a portion of the conveying path as illustrated in Figure 1–B;

Figure 6 is a transverse, vertical sectional view taken substantially upon a plane passing along section line 6—6 of Figure 5 illustrating the details of construction of the kicker mechanism;

Figure 7 is a detailed sectional view taken substantially upon a plane passing along section line 7—7 of Figure 6 illustrating the rollers for supporting the conveying belts;

Figure 8 is an exploded group perspective view illustrating the construction of the arm extending into the path of movement of the front end of a piece of lumber and the kicker for engaging the rear end thereof; and Figure 9 is a detailed view illustrating the means of attaching additional sections of the sorting mechanism, and specifically, the means for attaching the side member of the conveying path.

With reference to the accompanying drawings, the numeral 10 generally designates the lumber sorter of the present invention which is provided with a protective shed or open building 12 of any convenient construction adjacent the feeding end thereof. The entire apparatus is supported on a plurality of supporting legs 14 which may be provided as needed, and the supporting legs 14 are provided with transversely extending brace members 16 where desired.

A pair of longitudinal members 18 and 20 are provided in spaced parallel relation for journaling a plurality of rollers 22 therebetween. Each of the rollers 22 includes a cylindrical member 24 having a roller or ball bearing 26 at the end thereof mounted upon a transverse rod 28 which may be hollow and provided with lubrication fittings 30 at each end thereof for lubricating the bearings 26. The rollers 22 may be arranged in a horizontal plane or may be arranged to provide a generally inclined conveying surface as desired. Passing over one end of all of the rollers 22 is an elongated endless belt 32 which is driven from a generally flat pulley 34 on an electric motor 36 or any other suitable power source, thereby imparting rotation to all of the rollers 22 for moving pieces of lumber 38 along the upper surface of the rollers 22 when the lumber 38 has been positioned on edge in the conveying paths 40 formed by upstanding side members 42, substantially as illustrated in Figure 3.

The upstanding members 42 are supported from vertically disposed brackets 44 secured to a transverse member 46 supported between the upper ends of the diverging supporting legs 14. These side members 42 are constructed in sections that are provided with projecting flanges 48 for attachment in end-to-end relation wherein additional sections of the side members 42 may be added for making them as long as desired. The ends of the side members 42 are provided with angulated portions 50 forming a deflector for deflecting the lumber 38 from the path in which it is traveling laterally off onto the inclined legs 14 and thus downwardly onto the transverse supporting members 16, generally as illustrated in Figure 4.

As shown in Figure 1, certain of the paths 40 are relatively short, and certain of the paths 40 are relatively long. For instance, the path 40 at the extreme right hand section of the sorter 10 is relatively short and is provided with two pairs of kickers wherein the lumber 38 passing along the path 40 may be kicked off the sorter at three selected points in accordance with the length of the pieces of lumber. The longest pieces of lumber will be kicked off adjacent the entry point of the lumber and the shortest pieces will be kicked off at the farthest point of movement of the piece of lumber.

As illustrated in Figure 2, the side members 42 are provided with apertures 54 which are disposed in longitudinally spaced pairs wherein the pairs are progressively nearer to each other and also progressively nearer to the rollers wherein the lumber is sorted simultaneously as to length and width.

As illustrated in Figure 8, each of the kicker mechanisms includes a bracket 56 attached to the rear face of the side member 42 wherein the bracket 56 is provided with an upstanding rod 58 having a sleeve 60 positioned thereover together with a generally elongated angulated actuating arm 62 having an aperture 64 receiving the upper end of the rod 58 and a fastening cotter pin 66 is inserted through the upper end of the rod 58 for pivotally attaching the arm 62 to the rod 58 for movement thereon. One end of the arm 62 is provided with an aperture 68 receiving the downturned end 70 of an elongated actuating rod 72 which is secured thereto by a suitable cotter pin 74. The other end of the rod 72 is downturned, as indicated by the numeral 76, for attachment in an aperture 78 at one end of a substantially right angular kicker arm 80 and is secured thereto by a cotter pin 82. The central portion of the kicker arm 80 is provided with an aperture 84 for positioning over a vertical rod 86 mounted on a supporting bracket 88 wherein a spacing sleeve 90 is provided for retaining the arm 80 in parallel relation to the arm 62 and a cotter pin 92 is provided for retaining the arm 80 in assembled relation on the rod 86. In operation, the portion of the actuating arm 62 remote from the rod 72 projects through the forward aperture of each pair of apertures 54 into the path of movement 40 of the piece of lumber 38. When the piece of lumber 38 contacts this free end of the actuating arm 62, the end of the arm 62 having the aperture 68 therein moves rearwardly, thereby moving the actuating rod 72 rearwardly for pivoting the kicker arm 80 about the pivot pin formed by the rod 86. The free end of the kicker arm 80 is normally flush with the surface of the side member 42 in the rearmost of the pair of apertures 54 and when the rod 72 moves rearwardly, the free end of the arm 80 moves outwardly through the aperture 54 into the path of movement 40 of the lumber 38. If the length of the piece of lumber 38 is substantially equal to the distance between the apertures in each pair of apertures 54 or the distance between the rods 58 and 86, the free end of the kicker arm 80 will engage the inner vertical surface of the piece of lumber which is disposed on its edge and urge such a piece of lumber outwardly and out of the path of movement of the piece of lumber 38 wherein the lumber will be discharged laterally of the conveying path 40 onto the supporting members 16. If the piece of lumber 38 is of less thickness than the distance from the rollers 22 to the apertures 54, the arms 62 and 80 will not be contacted by the piece of lumber, thereby permitting it to move to the next set of apertures 54 which are spaced a relatively lesser distance from the rollers 22, thereby sorting the lumber as to length and size during each cycle of movement of the lumber through the path 40.

As previously stated, the plurality of paths of movement of the lumber 38 are arranged so that an operator will initially classify the pieces of lumber 38 as they are discharged from a suitable ramp or supply device 94 into certain categories as to width, thickness and general length. Certain of the pieces of lumber 38 will be positioned in certain of the paths 40 and others will be positioned in other paths 40. As illustrated in Figure 6, the actuating arm 62 is spaced considerably below the kicker arm 80 whereby the actuating arm 62 will be actuated by all pieces of lumber 38 within certain width ranges. A tension coil spring 98 is provided for returning the arms 62 and 80 to a normal position with the free end of the arms 62 being disposed in the path of movement of the pieces of lumber 38 and the free end of the kicker arm 80 being disposed flush with or behind the side member 42 which forms the edge of the path of movement 40.

In practical use of the present invention, the lumber 38 is positioned in the various paths of movement by an operator who generally classifies the lumber in accordance with general classification as to length and width. As the pieces of lumber move down the paths 40, the actuating arm 62 will be actuated by the front end thereof and the kicker arm 80 may kick the rear end, thereby kicking the piece of lumber off at the desired position so that the lumber may be arranged in packs 98. The paths of movement of the pieces of lumber 38 may be extended as long as necessary to get the necessary sorting steps desired. In addition to this, sequential sorting may be provided wherein a pack 98 which has been previously sorted may be run through a different path of movement for sorting into other categories.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures.

2. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said front and rear means being spaced in successively closer relationship.

3. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said rear means being disposed closely adjacent the bottom of the path and the front member being successively closer to the bottom of the path.

4. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said front means including a pivotal arm with a free end extending through the aperture into the path of movement of a piece of lumber for contact thereby, said rear means including a pivotal arm for movement through the rear aperture, a rod interconnecting said arms for simultaneous movement, said rear arm being normally disposed behind the side member and being projected therethrough for contact with a piece of lumber for kicking the lumber off the conveying path, and spring means returning said arms to a normal position.

5. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said conveying path having a bottom formed of a plurality of horizontally disposed rollers, and means for driving said rollers.

6. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said side member terminating in an angulated end deflector for forcing all lumber passing through the front and rear means off the conveying path.

7. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said front and rear means being spaced in successively closer relationship, said rear means being disposed closely adjacent the bottom of the path and the front member being successively closer to the bottom of the path.

8. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said front and rear means being spaced in successively closer relationship, said rear means being disposed closely adjacent the bottom of the path and the front member being successively closer to the bottom of the path, said front means including a pivotal arm with a free end extending through the aperture into the path of movement of a piece of lumber for contact thereby, said rear means including a pivotal arm for movement through the rear aperture, a rod interconnecting said arms for simultaneous movement, said rear arm being normally disposed behind the side member and being projected therethrough for contact with a piece of lumber for kicking the lumber off the conveying path, and spring means returning said arms to a normal position.

9. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said front and rear means being spaced in successively closer relationship, said rear means being disposed closely adjacent the bottom of the path and the front member being successively closer to the bottom of the path, said front means including a pivotal arm with a free end extending through the aperture into the path of movement of a piece of lumber for contact thereby, said rear means including a pivotal arm for movement through the rear aperture, a rod interconnecting said arms for simultaneous movement, said rear arm being normally disposed behind the side member and being projected therethrough for contact with a piece of lumber for kicking the lumber off the conveying path, and spring means returning said arms to a normal position, said conveying path having a bottom formed of a plurality of horizontally disposed rollers, and means for driving said rollers.

10. A lumber sorter comprising an elongated conveying path, an upstanding side member forming one side of said path, said side member having a plurality of pairs of longitudinally spaced apertures, means in the outermost aperture projecting into the path of movement of the front of a piece of lumber, and means disposed in the rear aperture for movement towards the piece of lumber in response to the means in the front aperture for knocking the lumber from the conveying path if it is long enough to extend between the front and rear apertures, said front and rear means being spaced in successively closer relationship, said rear means being disposed closely adjacent the bottom of the path, said front means including a pivotal arm with a free end extending through the aperture into the path of movement of a piece of lumber for contact thereby, said rear means including a pivotal arm for movement through the rear aperture, a rod interconnecting said arms for simultaneous movement, said rear arm being normally disposed behind the side member and being projected therethrough for contact with a piece of lumber for kicking the lumber off the conveying path, and spring means returning said arms to a normal position, said conveying path having a bottom formed of a plurality of horizontally disposed rollers, and means for driving said rollers, said side member terminating in an angulated end deflector for forcing all lumber passing through the front and rear means off the conveying path.

11. A lumber sorter comprising a plurality of conveying paths for conveying pieces of lumber on the edge, and means actuated by the lumber for sorting the lumber simultaneously as to length and width of the pieces of lumber.

References Cited in the file of this patent

UNITED STATES PATENTS

| 1,624,389 | Bratton et al. | Apr. 12, 1927 |
| 2,733,808 | Moseley | Feb. 7, 1956 |

FOREIGN PATENTS

| 50,134 | Sweden | Mar. 5, 1919 |